May 18, 1965 M. SIEGEL ET AL 3,184,725

MACHINE MONITORING APPARATUS

Filed June 8, 1961 2 Sheets-Sheet 1

INVENTORS
MARTIN SIEGEL
SEYMOUR ZELNICK

BY Harry Cohen

ATTORNEY

MACHINE MONITORING APPARATUS

Filed June 8, 1961 2 Sheets-Sheet 2

INVENTORS
MARTIN SIEGEL
SEYMOUR ZELNICK
BY Harry Cole
ATTORNEY

United States Patent Office 3,184,725
Patented May 18, 1965

1

3,184,725
MACHINE MONITORING APPARATUS

Martin Siegel, Roslyn, N.Y., and Seymour Zelnick, Toms River, N.J., assignors to Weldotron Corporation, Newark, N.J., a corporation of New Jersey Filed June 8, 1961, Ser. No. 115,804
13 Claims. (Cl. 340—213)

The present invention relates to apparatus for monitoring cyclic machines.

An object of this invention is to provide novel monitoring apparatus for automatically verifying proper machine performance or for detecting malfunction of the machine during recurrent machine cycles.

It is an important object of this invention to provide monitoring apparatus that is flexible and of general application to machines that operate cyclically on successive articles, the monitoring apparatus serving automatically to distinguish between proper operation of the article transfer means and failure of the article transfer means. In the event of malfunction, the monitoring apparatus provides control output useful for producing a warning signal or for automatically stopping the monitored machine, or for any desired comparable functions. An additional object of the invention resides in the provision of apparatus for monitoring plural portions of a cyclic machine, particularly for detecting failure of the article-transfer function at one or more locations. An object related to the foregoing is to provide an indication of where the failure occured among the plural positions monitored when the machine control interrupts machine operation.

The foregoing and other objects are achieved by the presently preferred embodiment of the invention that is described in detail below and shown in the accompanying drawings, this embodiment being illustrative of the various features of novelty. As will be noted, this illustrative embodiment includes a plurality of article detectors that are disposed at respective discharge points or article-transfer positions in a cyclic machine. A device coupled to the machine provides a long electrical pulse timed to start early in the machine cycle and to end near the end of the machine cycle. At the start of this long impulse, a bistable device in the illustrative monitoring apparatus is switched from its normal state to a second state. The article detectors jointly operate a gate that delivers a restoring pulse to the bistable device, but only if all of the detectors have been actuated by respective articles. The monitoring apparatus as shown and described includes a machine control that is controlled by the bistable device at the end of the long impulse. If the bistable device has been restored to its normal condition at the end of this pulse, indicating article detection by all the detectors, machine operation continues. If there has been a failure at any of the detectors, the gate does not deliver a restoring impulse to the bistable device. Consequently, when the control means becomes responsive to the bistable device in its second state, machine interruption follows.

For the purpose of rendering the control means non-responsive to the bistable device during the time interval when all the article detectors should be actuated by an article, the long pulse produced by the cyclic means is applied to the control means as a locking signal or hold-off bias. At the end of the long pulse, the bias is removed and the control means becomes responsive to the bistable device. Machine operation is maintained if the bistable device was restored to its normal state as a result of normal actuation of all of the article detectors. Machine operation is interrupted if any one or more of the detectors did not detect an article and the gate did not provide a restoring pulse. This is because the bistable device remains in its second state when the hold-off bias is removed from the control means at the end of the long impulse.

2

The article detectors may take the form of article-actuated mechanical switches, or photo-cell article detectors, or any other suitable detection apparatus. Where a blast of air is used for ejecting articles to be monitored, the photo-cell detector is preferred but the mechanical-switch detector is advantageous where the articles move (or should move) in a fixed, regular path. In any event, the article detectors may respond to their respective articles at different instants. Each article detector is arranged, in the illustrative apparatus disclosed, to operate a respective bistable unit from its normal state to an actuated state. All these bistable units feed a gate that emits a switching impulse when the last of all the bistable units is switched to its operated state. The gate may be a single-stage unit where only a few article detectors are used. Where many article detectors are used, the gate advantageously involves a number of low-level gates each controlled by a few detectors, and these low-level gates combine to control a master gate.

It may be considered that machine interruption has occurred, due to a detected failure at one location. The bistable units identified with the respective detectors are equipped with signalling means in the form of lights. In the event of machine interruption, the fault can be located quickly in the illustrative apparatus by means of the signal lights which are "on" for those detectors that function normally and "off" for those detectors where malfunction occurred.

The nature of the invention and its further objects and features of novelty will be more fully apparent from the following description in detail of the illustrative embodiment of the invention which is shown in the accompanying drawings. In the drawings.

Figure 1:
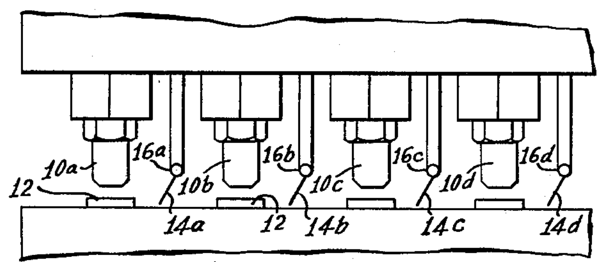
FIG. 1 is an elevation in diagrammatic form representing a multi-station transfer press, modified to incorporate the present invention.

Referring now to the drawings, FIG. 1 illustrates a multi-station transfer press, including a number of heads 10*a*, 10*b*, 10*c* and 10*d*, each of which carries a forming die for effecting one of a series of forming operations on articles 12. Following each pressing operation, articles 12 are transferred progressively from each head 10 to the next in sequence, right to left in FIG. 1, for example. A step-by-step conveyor (not shown) carries the workpieces 12 to the successive heads. In the course of transfer, each workpiece must move in a path such that a series of wire feelers 14*a*, 14*b*, 14*c* and 14*d* are deflected so as to close the corresponding contact devices 16*a*, 16*b*, 16*c* and 16*d*. In the event that any one of the workpieces 12 should become jammed in a die, then it would fail to be transferred to the next station. The corresponding wire feeler 14 would not be deflected and consequently the corresponding switching device 16 would not be operated.

Figure 2:
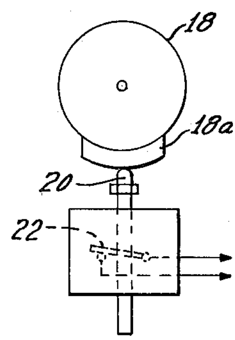
FIG. 2 is a detail of the apparatus in FIG. 1, drawn to larger scale.

The machine in FIG. 1 may be operated by an electric motor or by any suitable motor through a clutch, or by a hydraulic motor or the like. In each case, the machine is operated through repeated cycles. A cam 18 is shown in FIG. 2, connected to a shaft so as to rotate once in each cycle of operation of the machine of FIG. 1. The cam has a raised portion 18*a* that coacts with a spring-biased cam follower 20 arranged to close contacts 22 when cam follower 20 is engaged by raised portion 18*a*. Cam 18 closes contacts 22 at a time in the machine cycle prior to the transfer of the workpieces 12. Contacts 22 remain closed until a later time when the transfer of the workpieces should have been completed in the normal operation of the machine. The machine drive is arranged for control by the apparatus in FIGS. 3 and 4, which respond to the operation of contacts 22 and switching devices 16a, 16b, 16c and 16d. In the event of failure of any of the workpieces 12 to operate its corresponding sensing wire 14, during the time interval between the initial closing of contacts 22 and until reopening of those contacts, the machine operation will be interrupted and lights or other signals will signal the interruption of machine operation and also the location of the fault or abnormal condition.

Figure 3:
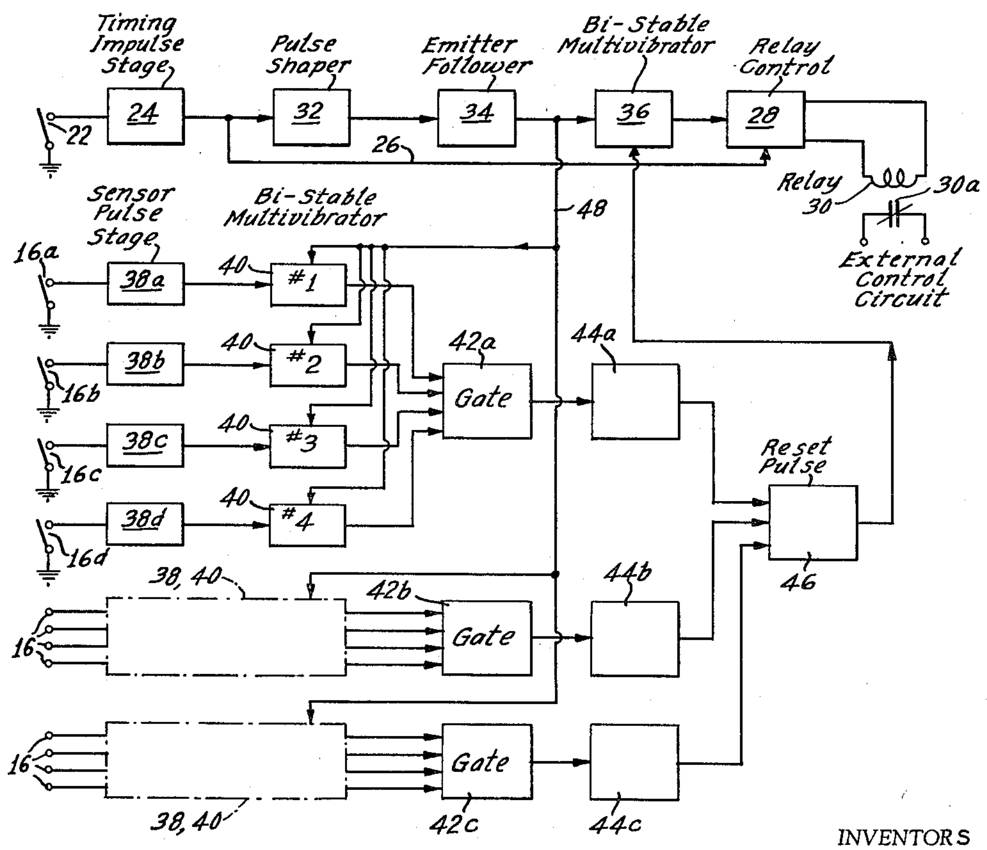
FIG. 3 is a block diagram of an illustrative embodiment of the invention in its presently preferred form.

FIG. 3 illustrates in block diagram form the control apparatus for the machine in FIG. 1. Cylically operated cam switch 22 operates a timing impulse stage 24. The timing impulse is transmitted by a coupling 26 to machine control means 28 that includes a relay 30 and contacts 30a. Machine control means 28 is locked in its machine-operating condition during the time that contacts 22 stay closed. Timing impulse stage 24 additionally is coupled to a pulse shaper 32 which transmits a short impulse through emitter follower 34 to a bistable multivibrator 36 at the moment when contacts 22 first close. Control means 28 become responsive to bistable device 36 at the end of the long impulse corresponding to the closure of contacts 22.

Bistable device 36 is arranged to control the machine-control means 28, 30, at the end of the cam-switch timing impulse. Multivibrator 36 has one state to condition the control means 28 for continuing operation of the machine and a second state to condition control means 28 for interrupting the machine. Multivibrator 36 is switched into its drive-interrupting state by the short pulse from pulse shaper 32 at the start of the timing impulse from stage 24. Control 28 does not respond to multivibrator 36 even when the multivibrator is in its machine-interrupting state so long as contacts 22 remain closed. Upon reopening of contacts 22, the timing impulse produced by unit 24 ends, and machine control 28 is free to respond to bistable device 36. If that multivibrator is still in its state for effecting machine interruption, control unit 28 will correspondingly interrupt machine operation.

In FIG. 3, sensor switch contacts 16a, 16b, 16c and 16d are shown connected to corresponding sensor pulse stages 38a, 38b, 38c and 38d. Each of these stages controls a corresponding bistable multivibrator 40 designated #1, #2, #3 and #4. These multivibrators 40 are all connected to the input of an "and" gate 42a, which is arranged to be shifted from its normal state to a switched condition only when all four multivibrators 40, #1, #2, #3 and #4 have been switched from their normal states by closure of respective contacts 16a, 16b, 16c and 16d. The output of gate 42a is coupled through inverter 44a to a further "and" gate 46, which is effective when operated to restore bistable mulivibrator 36 to its normal state from which it was switched by the short pulse from unit 32.

Additional points designated 16 represent additional article detectors. Units 38, 40 in phantom lines in FIG. 3 are identified with groups of sensor pulse stages 38 and multivibrators 40 like those described in connection with sensor switches or detectors 16a, 16b, 16c and 16d. One group of four detectors 16 and its associated pulse stages 38 and multivibrators 40 are connected to a second gate 44b, while a third group of four detectors 16 and circuit components 38, 40 are connected to another gate 44c. Gates 44a, 44b and 44c are coupled via phase inverters 42a, 42b and 42c to another gate 46 that has a reset connection to bistable multivibrator 36.

A common connection 48 extends from emitter follower 34 to each of the bistable multivibrators 40 so as to reset those multivibrators into their normal condition wherein they can respond to the closing of their corresponding sensor contacts 16.

The operation of the system in FIG. 3 is as follows:

During the operation of the machine of FIG. 1, contacts 22 close at a time relatively early in the machine cycle and remain closed until relatively late in the machine cycle. The start and end of contact closure is adjusted such that contacts 22 remain closed at least from a time just prior to the transfer of workpieces 12 until after all transfer operations should have taken place. Closure of contacts 22 causes unit 24 to generate what may be called an impulse of long duration. At the start of this long impulse, there are three effects. First, drive-control unit 28 is locked in its machine-operating condition so that, so long as contacts 22 remain closed, the whole apparatus remains in its machine-operating condition. Secondly, pulse shaper 32 generates a short impulse at the start of the long impulse of unit 24, and this short impulse drives bistable multivibrator 36 into its state corresponding to the drive-interrupting condition in unit 28. However, as previously indicated, machine control means 28 does not respond to device 36 so long as it is locked by the long impulse in its machine-operation condition A third effect of closing of contacts 22 is to transmit a short initial pulse via line 48 for resetting multivibrators 40 in condition to respond to contact devices 16.

During operation of the machine, while contacts 22 remain closed, each one of the contact devices 16a, 16b, 16c and 16d should be closed by an article or part moving out of the previous die. In the case of metal articles or parts these contact devices 16 may be omitted since the wire feelers 14a–14d, when engaged by said parts and thereby grounding therethrough, are sufficient to close the respective circuits for generating the "part" pulses. Contact devices 16 need not all close at precisely the same instant, so long as they all are closed at least momentarily within the duration of closure of contacts 22. Assuming that all of the contact devices 16 are actuated during this time, bistable multivibrators 40 are all switched out of their normal condition and apply a switching bias to their respective gates 42. This switched state is transmitted through respective gates 42a, 42b and 42c and inverters 44a, 44b and 44c to reset pulse unit 46 and to bistable multivibrator 36. In this way, if all contact devices 16 are actuated, bistable multivibrator 36 is restored to its state corresponding to continued machine operation during the time that contacts 22 remain closed. It will be recalled that, when contacts 22 open, unit 24 is no longer effective through coupling connection 26 to maintain control unit 28 in its machine-operating condition. Provided that all detectors 16 were actuated by respective articles, multivibrator 36 is in condition to maintain control unit 28 in its machine-operating condition after contacts 22 reopen.

In the event of an abnormal condition, as for example if one of the workpieces 12 should fail to transfer and should therefore fail to close the corresponding sensor contacts 16, one of the bistable multivibrators 40 would remain in its normal condition. This would prevent the corresponding "and" gate 42a, 42b or 42c from producing the necessary switching signal. If any gate 42a, 42b or 42c does not provide the proper switching signal, gate 46 does not produce a switching signal. Thus, in the event of an abnormal condition, bistable multivibrator 36 remains in its state corresponding to machine-interrupting condition for drive control unit 28. Thereafter, when contacts 22 reopen and coupling connection 26 no longer locks machine control unit in its machine-operating condition, unit 28 is switched into its machine-interrupting condition by bistable device 36. The external control circuit, including relay 30 and relay contacts 30a, are correspondingly operated into machine-interrupting condition.

By means of the system described, an automatic check is provided for continuously verifying the normal functioning of the apparatus that is monitored. Any number of check points may be provided. The concept is widely applicable as in the protection of punch-presses, transfer-presses, multi-slide machines, automatic screw machines and conveyors. In its more frequent application, the malfunction to be detected is the failure of a part to be transferred out of a work position, so as to make way for the next part to be treated. Where this transfer is effected by means of a conveyor, the sensing wire 14 and switch contacts 16 can be used for article detection. However, the control apparatus is equally applicable where air ejection and high-speed travel of the article are involved. In such applications, a photocell switching device may be used at each point designated 16 in FIG. 3.

The timing impulse produced by contacts 22 is derived from the machine being monitored. Consequently, the monitoring system described is insensitive to speed variations, and requires no adjustment in relation to machine-cycle time or variations in machine-cycle time.

Figure 4:
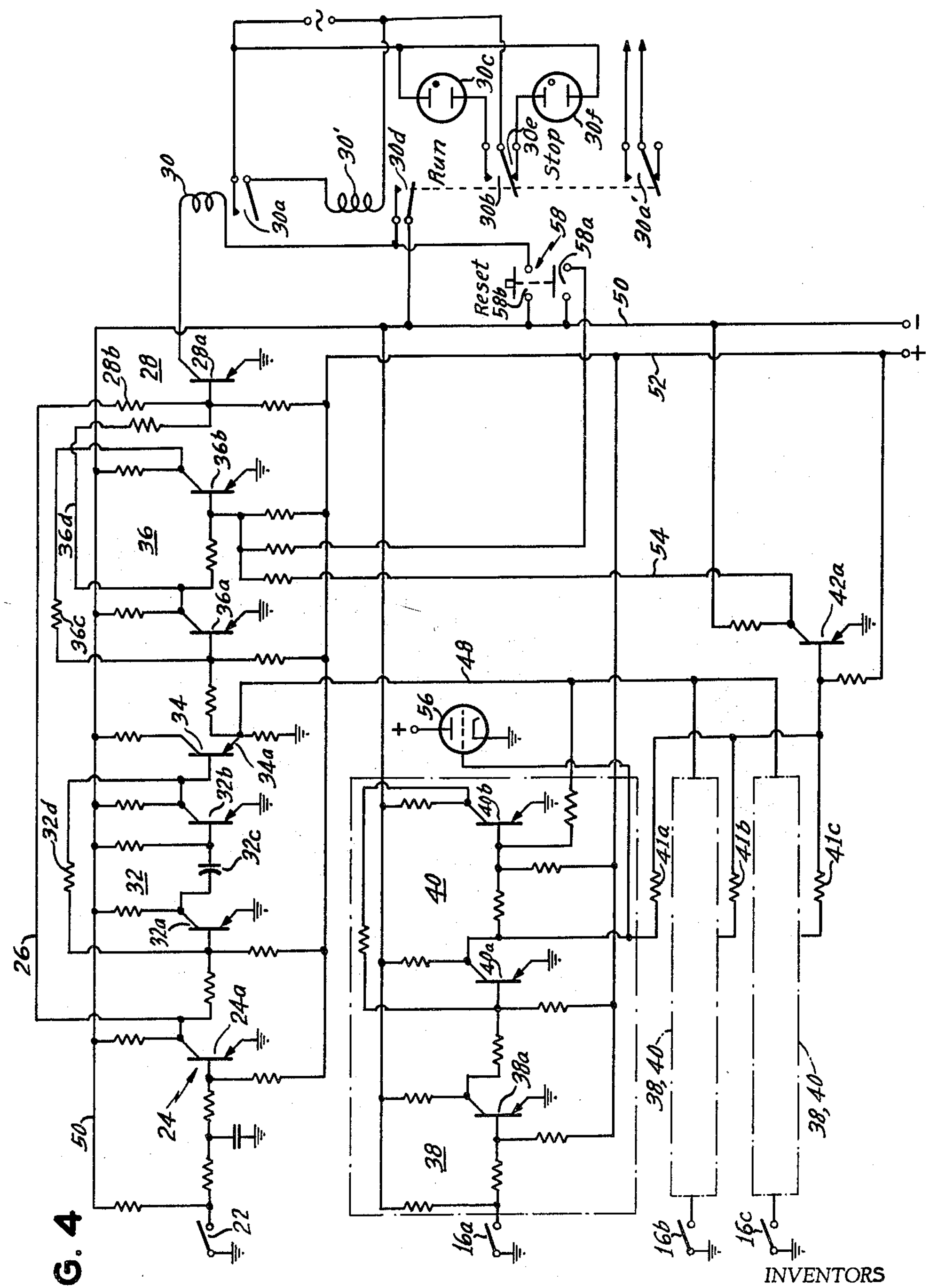
FIG. 4 is the wiring diagram of a simplified embodiment of the invention similar to the embodiment in FIG. 3.

FIG. 4 is a wiring diagram showing the internal details of a highly successful form of apparatus in FIG. 3, FIG. 4 being limited to three detectors **16*a*, 16*b* and 16*c*, and one gate rather than the twelve such detectors 16** the several gates illustrated in FIG. 3. Corresponding numerals in FIG. 3 and FIG. 4 refer to corresponding parts.

In FIG. 4, the timing impulse stage 24 includes a transistor **24*a* that is biased in its "on" condition so long as contacts 22 are open. Pulse shaper stage 32 in FIG. 4 includes two transistors 32*a* and 32*b*, and a condenser 32*c* interposed in the collector-to-base coupling from transistor 32*a* to transistor 32*b*. So long as transistor 24*a* is switched "on," transistor 32*a* is "off." Transistor 32*b* has a grounded emitter and has negative returns for both its base and its collector, so that transistor 32*b* is normally continuously "on." An emitter-follower transistor 34 has its base direct-coupled to the collector of transistor 32*b*. Emitter 34*a* closely follows the potential of the collector of transistor 32*b*. With transistor 32*b* normally heavily conducting, its collector is closed to the potential of its emitter (which is grounded) and, correspondingly, emitter 34*a*** is at virtually the same potential.

Bistable multivibrator 36 in FIG. 4 includes transistors **36*a* and 36*b*, a feedback connection including resistor 36*c* extending from the collector of transistor 36*b* to the base of transistor 36*a*. In the normal state of bistable multivibrator 36, transistor 36*b* is heavily conducting, so that the collector of transistor 36*b* is switched close to ground potential. This condition acts through resistor 36*c* to maintain transistor 36*a* non-conducting. The relay control stage 28 in FIG. 4 includes transistor 28*a* that is normally heavily conducting so as to maintain relay 30 energized. Relay contacts 30*a* energize a further heavy-duty relay 30' having contacts 30*a*' for maintaining the machine-operating circuit in its operating condition. Contacts 30*b* of relay 30' are also normally closed, and these maintain "Run" indicator light 30*c* "on." Relay 30' has normally open contacts 30*e*, which extend to "Stop" indicator lamp 30*f*. Relay contacts 30*d* of relay 30' are in series with the winding 30, thus completing a direct-current circuit from the collector of transistor 28*a* through winding 30 and contacts 30*d* to the negative supply line 50. In the event that the transistor 28*a* should be switched "off," relay 30 is deenergized, allowing contacts 30*a* to open and allowing relay 30' to be deenergized. When this occurs, contacts 30*e* close and contacts 30*b* open. "Stop" light 30*f* is turned on and "Run" light 30*c*** is turned off.

The transistors are all of the same type, being type 2N217, in a practical form of the circuit shown. These transistors have their collectors connected through load resistors to the negative supply line 50. In most cases there is a resistor between the transistor base and a positive supply line 52. All the transistors except transistor 34 have their collectors grounded at a direct-current potential midway between lines 50 and 52 in the above-mentioned practical form of this circuit.

Operation of the circuit thus far described is as follows: when contacts 22 are closed, as by means of the cam switch in FIG. 2, transistor **24*a* is switched "off." When this occurs, the collector of transistor 24*a* assumes the potential of negative supply line 50 and, acting through coupling connection including decoupling resistor 28*b*, drives the base of transistor 28*a* strongly negative so as to "lock" transistor 28*a* in its switched-on condition. This is maintained so long as contacts 22** remain closed.

The sudden shift of the collector of transistor **24*a* from its previous near-ground potential to the potential of line 50 switches transistor 32*a* "on." The collector of transistor 32*a* is thus shifted suddenly to near-ground potential and a positive impulse is transmitted by condenser 32*c* to the base of transistor 32*b*. This has the effect of sharply reducing the current drawn by the collector of transistor 32*b* which, consequently, abruptly shifts toward the negative potential of line 50. This effect is enhanced by the feedback coupling 32*d*. There is a corresponding sharp negative shift in the potential of the base of transistor 34. Emitter 34*a* follows its base and transistor 36*a* is switched "on." This switches transistor 36*b* "off." The collector of transistor 36*b* now being nearly at the negative potential of line 50, the feedback connection including resistor 36*c* maintains the base of transistor 36*a* strongly negative and maintains transistor 36*a* firmly switched "on." This is the state of the bistable multivibrator 36 which corresponds to the machine-interrupting condition of transistor 28*a*. The collector of transistor 36*a* is switched to near-ground potential, and this potential is coupled via line 36*d* containing a decoupling resistor to the base of transistor 28*a*. However, the tendency of line 36*d* with its near-ground potential to switch transistor 28*a* is inhibited so long as switch 22 remains closed and line 26 remains strongly negative due to the switched-off state of transistor 24*a*. Consequently, despite the fact that bistable stage 36 is in its condition that tends ordinarily to switch drive-control unit 28 into its machine-interrupting condition, connection 26 maintains drive unit 28** in its machine-operating condition.

The sensor contacts or detector **16*a* in FIG. 4 are seen connected in the base circuit of transistor 38*a*, which is normally biased "on" so long as contacts 16*a* remain open. The collector of transistor 38*a* is coupled to the base of transistor 40*a* of bistable unit 40 which also includes transistor 40*b***.

It will be recalled from a discussion of the operation of the emitter-follower transistor 34 that closure of contacts 22 initially produced a strongly negative impulse at emitter **34*a*. This correspondingly impresses a strongly negative impulse on line 48 that extends to the base of transistor 40*b*. Accordingly, at the start of the long impulse generated by switch 22 and transistor stage 24, transistor 40*b* of bistable device 40 is switched "on." Correspondingly, transistor 40*a*** is switched "off."

When contacts **16*a* are closed in the detection function, transistor 38*a* is switched "off." The collector of transistor 38*a* shifts sharply negative and switches transistor 40*a* "on." The collector of transistor 40*a* shifts sharply toward ground potential, carrying the base of transistor 40*b* in the same sense and thereby switching transistor 40*b* "off." Unit 40 provides temporary storage to evidence transitory operation of switch 16*a***.

Contacts **16*b* and 16*c* control circuits that are the exact duplicate of that described in connection with contacts 16*a*. Each of these contacts 16*a*, 16*b* and 16*c* is identified with a corresponding connection through a decoupling resistor 41*a*, 41*b* and 41*c* to the base of gate transistor 42*a*. Before closure of any of the contacts 16*a*, 16*b* or 16*c*, transistor 40*a* and the corresponding transistors associated with contacts 16*b* and 16*c*** are all in their switched-off condition; and consequently, all of the circuits including resistors 41a, 41b and 41c tend to maintain transistor 42a switched "on." This condition is maintained despite the switching of transistor 40a "on" as well as the switching "on" of one other transistor like transistor 40a that is associated with switch 16b or 16c. However, if all three switches 16a, 16b and 16c are closed, then transistor 40a and the other two like it are switchd "on." All three resistors 41a, 41b and 41c shift close to ground potential and consequently shift gating transistor 42a "off." It may be noted that the collector of this transistor is coupled by a line 54 to the base of transistor 36b of bistable unit 36. When transistor 42a is switched "off," its collector shifts sharply negative and thus a negative drive is impressed on the base of transistor 36b. This results in transistor 36b being switched "on" and transistor 36a "off," bistable device 36 being thus switched back into its state corresponding to the machine-operating condition of transistor 28a.

The operation of the whole circuit of FIG. 4 may be summarized. It will be recalled that closure of contacts 22 causes bistable device 36 to switch into its state that tends to switch transistor 28a "off." That is the machine-interrupting condition of machine-control transistor 28a. Bistable device 36 applies this control to machine-control transistor 28a via connection 36d. However, closure of contacts 22 also switches lead 26 to a strong negative potential that is impressed on the base of transistor 28a so as to maintain that transistor in its machine-operating condition. As a third result of the initial closing of contacts 22, a strong negative impulse is developed at emitter 34a so as to switch transistor 40b "on" and thus "reset" bistable device 40 associated with switch 16a. Similar bistable devices associated with sensor contacts or detectors 16b and 16c are also reset by strong negative potential on lead 48.

Subsequently, during the maintenance of contacts 22 closed, the contacts 16a, 16b and 16c will all close in the course of normal functioning of the monitored machine. Where all of the sensor switches or detectors 16 close during maintenance of contacts 22 closed, "and" gate transistor 42a in FIG. 4 is switched off and produces a strong negative potential on line 54, so as to restore gate 36 to its machine-operating state, in terms of its control over machine-control transistor 28a.

At the end of the long interval during which all detectors 16 should have been actuated, contacts 22 open and remove the locking bias from lead 26 to the machine-control transistor 28a. However, due to the closure of all of the contacts 16a, 16b and 16c, at least momentarily, gate 42a causes bistable device 36 to switch into its machine-operating condition. This applies machine-operating bias on lead 36d connected to the base of machine-control transistor 28a. Accordingly, after contacts 22 open, the drive of the monitored machine continues but only if each of the contacts 16a, 16b and 16c was at least momentarily closed during the time interval when contacts 22 remained closed.

If any one of the contacts 16a, 16b or 16c failed to close while contacts 22 were closed, gate 42a would remain switched "on" and bistable device 36 would remain in its condition applying near-ground potential to connection 36d and thus tending to cause machine-control transistor 28a to interrupt machine operation. Thereafter, when contacts 22 open, hold-off bias of line 26 is terminated. Transistor 28a is switched "off" and relay 30 is deenergized to cause interruption of operation of the monitored machine.

Associated with each circuit controlled by one of the contacts 16 is a grid-controlled indicator lamp 56, whose grid is coupled to the collector of the normally "off" transistor 40a. Closure of most of the sensor contacts 16a, 16b and 16c causes switching "on" of the corresponding transistor 40a and shift of the collectors of those transistors toward ground potential so as to turn "on" indicator units 56. Any indicator unit 56 that is not "on" signals malfunction at the related detector. Where the indicator lamp 56 remains "off," it follows that the corresponding sensor switch failed to be closed during the "closed" time-interval of cam switch 22. The machine stops, and the condition of all the lamps remains in effect until renewed operation causes reclosing of switch 22.

The machine attendant locates the difficulty and corrects it; and thereafter he must be able to restore the machine to operation. For this purpose a "reset" double-pole single-throw switch 58 is provided. One pair of contacts 58a impress strong negative potential on the base of transistor 36b, thereby switching bistable device 36 out of its machine-interrupting state and into its machine-operating condition. The other pair of contacts 58b restore the circuit from the collector of machine-control transistor 28a through relay 30 to the negative supply line 50 of the direct-current supply. This, in turn, energizes relay 30', closes holding contacts 30d for relay 30, and closes contacts 30b to turn on "Run" light 30c and at the same time opening contacts 30e to turn "off" light 30f. Energization of relay 30' also closes contacts 30a' so as to condition the machine control circuit for machine operation. Normal operation of the monitored machine may then be resumed by operating the usual motor-starting switches.

The presently preferred embodiment of the invention and its various novel features and many of the advantages obtained therefrom have been disclosed in detail above, and will provide instruction to one skilled in the art of an exemplary way to apply the invention. However, the foregoing specific apparatus, while it is presently preferred, will be found susceptible of a broad latitude of modification and varied application by those skilled in the art. Consequently, this invention should be broadly construed, in accordance with its full spirit and scope.

What is claimed is:

1. In a machine cycle operation monitoring system, control means for controlling the operation of the machine, a device having a control connection to said control means, said device having a first state to condition the control means for machine operation and a second state to condition the control means for interrupting machine operation, means arranged to shift the device into said second state once in each machine cycle and to concurrently generate a long pulse time interval signal for overriding said device by conditioning said control means for machine operation for the duration of said signal, and monitoring means adapted to operate during each machine cycle prior to the termination of said signal and in turn operable, upon the operation thereof, to restore said device to said first state whereby, so long as said monitoring means operates during each machine cycle prior to the termination of said signal, the said device will be restored thereby to said first state thereof to in turn maintain said control means conditioned for machine operation after the termination of said signal to permit commencement of the succeeding machine cycle.

2. In a machine cycle operation monitoring system, control means for controlling the operation of the machine, a device having a control connection to said control means, said device having a first state to condition the control means for machine operation and a second state to condition the control means for interrupting machine operation, means arranged to shift the device into said second state once in each machine cycle and to concurrently generate a long pulse time interval signal for overriding said device by conditioning said control means for machine operation for the duration of said signal, and monitoring means adapted to operate during each machine cycle prior to the termination of said signal and in turn operable, upon the operation thereof, to restore said device to said first state whereby so long as said monitoring means operates during each machine cycle prior to the termination of said signal, the said device will be restored thereby to said first state thereof to in turn maintain said control means conditioned for machine operation after the termination of said signal to permit commencement of the succeeding machine cycle, said monitoring means comprising an article detector operable by the passage of an article therepast during each cycle of the machine to provide an output indicative thereof.

3. In a machine cycle operation monitoring system, control means for controlling the operation of the machine, a device having a control connection to said control means, said device having a first state to condition the control means for machine operation and a second state to condition the control means for interrupting machine operation, means arranged to shift the device into said second state once in each machine cycle and to concurrently generate a long pulse time interval signal for overriding said device by conditioning said control means for machine operation for the duration of said signal, and monitoring means adapted to operate during each machine cycle prior to the termination of said signal and in turn operable, upon the operation thereof, to restore said device to said first state whereby, so long as said monitoring means operates during each machine cycle prior to the termination of said signal, the said device will be restored thereby to said first state thereof to in turn maintain said control means conditioned for machine operation after the termination of said signal to permit commencement of the succeeding machine cycle, said monitoring means comprising a plurality of article detectors each of which is operable by the passage of an article therepast during each cycle of the machine to provide an output indicative thereof.

4. In a machine cycle operation monitoring system, control means for controlling the operation of the machine, a device having a control connection to said control means, said device having a first state to condition the control means for machine operation and a second state to condition the control means for interrupting machine operation, means arranged to shift the device into said second state once in each machine cycle and to concurrently generate a long pulse time interval signal for overriding said device by conditioning said control means for machine operation for the duration of said signal, and monitoring means adapted to operate during each machine cycle prior to the termination of said signal and in turn operable, upon the operation thereof, to restore said device to said first state whereby, so long as said monitoring means operates during each machine cycle prior to the termination of said signal, the said device will be restored thereby to said first state thereof to in turn maintain said control means conditioned for machine operation after the termination of said signal to permit commencement of the succeeding machine cycle, said monitoring means comprising a plurality of article detectors each of which is operable by the passage of an article therepast during each cycle of the machine to provide an output indicative thereof, and means connected to said article detectors and operable, only upon the provision of an output by each of said detectors, to in turn provie an output for restoring said device to said first state thereof.

5. In a machine cycle operation monitoring system, control means for controlling the operation of the machine, a device having a control connection to said control means, said device having a first state to condition the control means for machine operation and a second state to condition the control means for interrupting machine operation, means arranged to shift the device into said second state once in each machine cycle and to concurrently generate a long pulse time interval signal for overriding said device by conditioning said control means for machine operation for the duration of said signal, and monitoring means adapted to operate during each machine cycle prior to the termination of said signal and in turn operable, upon the operation thereof, to restore said device to said first state whereby, so long as said monitoring means operates during each machine cycle prior to the termination of said signal, the said device will be restored thereby to said first state thereof to in turn maintain said control means conditioned for machine operation after the termination of said signal to permit commencement of the succeeding machine cycle, said monitoring means comprising a plurality of article detectors each of which is operable by the passage of an article therepast during each cycle of the machine to provide an output indicative thereof, said device comprising a bistable multivibrator, and an "and" gate connected to said article detectors and operable, only upon the provision of an output by each of said detectors, to in turn provide an output for restoring said device to said first state thereof.

6. In a machine cycle operation monitoring system, control means for controlling the operation of the machine, a device having a control connection to said control means, said device having a first state to condition the control means for machine operation and a second state to condition the control means for interrupting machine operation, means arranged to shift the device into said second state once in each machine cycle and to concurrently generate a long pulse time interval signal for ovrriding said device by conditioning said control means for machine operation for the duration of said signal, and monitoring means adapted to operate during each machine cycle prior to the termination of said signal and in turn operable, upon the operation thereof, to restore said device to said first state whereby, so long as said monitoring means operates during each machine cycle prior to the termination of said signal, the said device will be restored thereby to said first state thereof to in turn maintain said control means conditioned for machine operation after the termination of said signal to permit commencement of the succeeding machine cycle, said monitoring means comprising a plurality of article detectors each of which is operable by the passage of an article therepast during each cycle of the machine to provide an output indicative thereof, and a bistable multivibrator connected to each of said article detectors and switchable from a first to a second state by the operation thereof, and means connected to said multivibrators and operable, only upon the switching of each of said multivibrators from said first to said second state, to in turn provide an output for restoring said bistable device to said first state thereof.

7. In a machine cycle operation monitoring system, control means for controlling the operation of the machine, a device having a control connection to said control means, said device having a first state to conditon the control means for machine operation and a second state to condition the control means for interrupting machine operation, means arranged to shift the device into said second state once in each machine cycle and to concurrently generate a long pulse time interval signal for overriding said device by conditioning said control means for machine operation for the duration of said signal, and monitoring means adapted to operate during each machine cycle prior to the termination of said signal and in turn operable, upon the operation thereof, to restore said device to said first state whereby, so long as said monitoring means operates during each machine cycle prior to the termination of said signal, the said device will be restored thereby to said first state thereof to in turn maintain said control means conditioned for machine operation after the termination of said signal to permit commencement of the succeeding machine cycle, said monitoring means comprising a plurality of article detectors each of which is operable by the passage of an article therepast during each cycle of the machine to provide an output indicative thereof, and a bistable multivibrator connected to each of said article detectors and switchable from a first to a second state by the operation thereof, and an "and" gate connected to said multivibrators and operable, only upon the switching of each of said multivibrators from said first to said second state to in turn provide an output for restoring said bistable device to said first state thereof.

8. In a machine cycle operation monitoring system, control means for controlling the operation of the machine, a device having a control connection to said control means, said device having a first state to condition the control means for machine operation and a second state to condition the control means for interrupting machine operation, means arranged to shift the device into said second state once in each machine cycle and to concurrently generate a long pulse time interval signal for overriding said device by conditioning said control means for machine operation for the duration of said signal, and monitoring means adapted to operate during each machine cycle prior to the termination of said signal and in turn operable, upon the operation thereof, to restore said device to said first state whereby, so long as said monitoring means operates during each machine cycle prior to the termination of said signal, the said device will be restored thereby to said first state thereof to in turn maintain said control means conditioned for machine operation after the termination of said signal to permit commencement of the succeeding machine cycle, said signal generating means comprising a cam operated switch and a timing impulse stage operable thereby, and said control means comprising a control circuit operable to control the supply of power to the machine operating means.

9. In a machine cycle operation monitoring system, control means for controlling the operation of the machine, a device having a control connection to said control means, said device having a first state to condition the control means for machine operation and a second state to condition the control means for interrupting machine operation, means arranged to shift the device into said second state once in each machine cycle and to concurrently generate a long pulse time interval signal for overriding said device by conditioning said control means for machine operation for the duration of said signal, and monitoring means adapted to operate during each machine cycle prior to the termination of said signal and in turn operable, upon the operation thereof, to restore said device to said first state whereby, so long as said monitoring means operates during each machine cycle prior to the termination of said signal, the said device will be restored thereby to said first state thereof to in turn maintain said control means conditioned for machine operation after the termination of said signal to permit commencement of the succeeding machine cycle, said monitoring means comprising a plurality of article detectors each of which is operable by the passage of an article therepast during each cycle of the machine to provide an output indicative thereof, and means connected to said article detectors and operable, only upon the provision of an output by each of said detectors, to in turn provide an output for restoring said device to said first state thereof, said signal generating means comprising a cam operated switch and a timing impulse stage operable thereby, and said control means comprising a control circuit operable to control the supply of power to the machine operating means.

10. In a machine cycle operation monitoring system, control means for controlling the operation of the machine, a device having a control connection to said control means, said device having a first state to condition the control means for machine operation and a second state to condition the control means for interrupting machine operation, means arranged to shift the device into said second state once in each machine cycle and to concurrently generate a long pulse time interval signal for overriding said device by conditioning said control means for machine operation for the duration of said signal, and monitoring means adapted to operate during each machine cycle prior to the termination of said signal and in turn operable, upon the operation thereof, to restore said device to said first state whereby, so long as said monitoring means operates during each machine cycle prior to the termination of said signal, the said device will be restored thereby to said first state thereof to in turn maintain said control means conditioned for machine operation after the termination of said signal to permit commencement of the succeeding machine cycle, said monitoring means comprising a plurality of article detectors each of which is operable by the passage of an article therepast during each cycle of the machine to provide an output indicative thereof, and a bistable multivibrator connected to each of said article detectors and switchable from a first to a second state by the operation thereof, and means connected to said multivibrators and operable, only upon the switching of each of said multivibrators from said first to said second state, to in turn provide an output for restoring said bistable device to said first state thereof, and a signal light controlled by each multivibrator for providing an indication of which article detector failed to provide an output.

11. In a machine cycle operation monitoring system, control means for controlling the operation of the machine, a device having a control connection to said control means, said device having a first state to condition the control means for machine operation and a second state to condition the control means for interrupting machine operation, means arranged to shift the device into said second state once in each machine cycle and to concurrently override said device by conditioning said control means for machine operation for a predetermined time interval, and monitoring means adapted to operate during each machine cycle prior to the expiration of said time interval and in turn operable, upon the operation thereof, to restore said device to said first state whereby, so long as said monitoring means operates during each machine cycle prior to the expiration of said time interval, the device will be restored thereby to said first state thereof to in turn maintain said control means conditioned for machine operation after the expiration of said time interval to permit commencement of the succeeding machine cycle.

12. In a machine cycle operation monitoring system, control means for controlling the operation of the machine, a device having a control connection to said control means, said device having a first state to condition the control means for machine operation and a second state to condition the control means for interrupting machine operation, means arranged to shift the device into said second state once in each machine cycle and to concurrently override said device by conditioning said control means for machine operation for a predetermined time interval, and monitoring means adapted to operate during each machine cycle prior to the expiration of said time interval and in turn operable, upon the operation thereof, to restore said device to said first state whereby, so long as said monitoring means operates during each machine cycle prior to the expiration of said time interval, the device will be rstored thereby to said first state thereof to in turn maintain said control means conditioned for machine operation after the expiration of said time interval to permit commencement of the succeeding machine cycle, said monitoring means comprising a plurality of article detectors each of which is operable by the passage of an article therepast during each cycle of the machine to provide an output indicative thereof, and means connected to said article detectors and operable, only upon the provisioin of an output by each of said detectors, to in turn provide an output for restoring said device to said first state thereof.

13. In a machine cycle operation monitoring system, control means for controlling the operation of the machine, a device having a control connection to said control means, said device having a first state to condition the control means for machine operation and a second state to condition the control means for interrupting machine operation, means arranged to shift the device into said second state once in each machine cycle and to concurrently override said device by conditioning said control means for machine operation for a predetermined time interval, and monitoring means adapted to operate during each machine cycle prior to the expiration of said time interval and in turn operable, upon the operation thereof, to restore said device to said first state whereby, so long as said monitoring means operates during each machine cycle prior to the expiration of said time interval, the device will be restored thereby to said first state thereof to in turn maintain said control means conditioned for machine operation after the expiration of said time interval to permit commencement of the succeeding machine cycle, said monitoring means comprising a plurality of article detectors each of which is operable by the passage of an article therepast during each cycle of the machine to provide an output indicative thereof, said device comprising a bistable multivibrator, and an "and" gate connected to said article detectors and operable only upon the provision of an output by each of said detectors, to in turn provide an output for restoring said device to said first state thereof.

References Cited by the Examiner

UNITED STATES PATENTS

| | | | |
|---|---|---|---|
| 2,793,344 | 5/57 | Reynolds | 340—174.1 |
| 2,813,259 | 11/57 | Burkhart | 340—147 |
| 3,002,131 | 9/61 | Gerosolina | 340—164 |
| 3,029,421 | 4/62 | Beguin | 340—213.1 |
| 3,031,646 | 4/62 | Reinholtz | 340—146.1 |

OTHER REFERENCES

Jenney, F. F.: Missing Pulse Detector in IBM Technical Disclosure Bulletin, vol. 2, No. 4, December 1959, pp. 66, 67.

NEIL C. READ, *Primary Examiner.*